US008180476B2

(12) United States Patent  (10) Patent No.: US 8,180,476 B2
Mori et al.  (45) Date of Patent: May 15, 2012

(54) MACHINING STATE CHECKING METHOD AND MACHINING STATE CHECKING APPARATUS

(75) Inventors: Masahiko Mori, Yamatokoriyama (JP); Xiaodong Tian, Davis, CA (US); Bingyan Zhao, Davis, CA (US); Makoto Fujishima, Davis, CA (US); Zhe Jin, Davis, CA (US)

(73) Assignee: Mori Seiki Co., Ltd., Yamato-Koriyama (JP)

( * ) Notice: Subject to any disclaimer, the term of this patent is extended or adjusted under 35 U.S.C. 154(b) by 283 days.

(21) Appl. No.: 12/553,577

(22) Filed: Sep. 3, 2009

(65) Prior Publication Data

US 2010/0063617 A1 Mar. 11, 2010

Related U.S. Application Data

(60) Provisional application No. 61/094,624, filed on Sep. 5, 2008.

(51) Int. Cl.
  *G06F 19/00* (2011.01)
  *G05B 19/04* (2006.01)
  *G06K 9/00* (2006.01)
  *G06T 17/00* (2006.01)

(52) U.S. Cl. ........ 700/160; 700/163; 700/175; 700/192; 700/195; 700/253; 382/154; 345/420

(58) Field of Classification Search .............. 700/97–98, 700/118, 159–160, 163, 175, 186–187, 192–193, 700/195, 253–254; 382/154; 345/419–421
See application file for complete search history.

(56) References Cited

U.S. PATENT DOCUMENTS

| 4,477,822 | A | * | 10/1984 | Luoma et al. | 346/136 |
|---|---|---|---|---|---|
| 4,871,252 | A | * | 10/1989 | Beni et al. | 356/457 |
| 5,301,284 | A | * | 4/1994 | Estes et al. | 711/203 |
| 6,772,038 | B2 | * | 8/2004 | Kadono | 700/159 |
| 6,775,403 | B1 | * | 8/2004 | Ban et al. | 382/154 |
| 7,269,471 | B2 | * | 9/2007 | Kadono | 700/159 |
| 7,496,411 | B2 | * | 2/2009 | Nakamura | 700/11 |
| 7,818,091 | B2 | * | 10/2010 | Kazi et al. | 700/259 |
| 7,852,355 | B2 | * | 12/2010 | Friedrich et al. | 345/633 |
| 2001/0000805 | A1 | * | 5/2001 | Kadono | 700/182 |
| 2002/0082742 | A1 | * | 6/2002 | Kadono | 700/160 |

(Continued)

FOREIGN PATENT DOCUMENTS

JP 2006-326740 A 12/2006

*Primary Examiner* — Ramesh Patel

(74) *Attorney, Agent, or Firm* — Westerman, Hattori, Daniels & Adrian, LLP

(57) ABSTRACT

The present invention provides a machining state checking apparatus and method for checking whether a workpiece mounted on a machine tool and a workpiece fixture are shifted. A machining state checking apparatus has an actual CCD camera for imaging a workpiece fixed on a machine tool and a workpiece fixture and generating actual two-dimensional image data thereof, a virtual image generating section for generating virtual two-dimensional image data of the workpiece and workpiece fixture based on data on three-dimensional models of the workpiece and workpiece fixture, a comparing section for comparing the actual two-dimensional image data and virtual two-dimensional image data generated by the actual CCD camera and the virtual image generating section, respectively, and determining whether they match each other by comparing the portions corresponding to the workpiece and workpiece fixture in the actual two-dimensional image and the virtual two-dimensional images of the workpiece and workpiece fixture.

6 Claims, 12 Drawing Sheets

U.S. PATENT DOCUMENTS

| | | | |
|---|---|---|---|
| 2002/0133264 A1* | 9/2002 | Maiteh et al. | 700/182 |
| 2004/0093103 A1* | 5/2004 | Nakamura | 700/96 |
| 2004/0181305 A1* | 9/2004 | Hertinger | 700/178 |
| 2007/0088526 A1* | 4/2007 | Friedrich et al. | 702/150 |
| 2008/0091394 A1* | 4/2008 | Hahn et al. | 703/7 |
| 2009/0015668 A1* | 1/2009 | Tian et al. | 348/92 |
| 2009/0070077 A1* | 3/2009 | Tian et al. | 703/1 |
| 2009/0259444 A1* | 10/2009 | Dolansky et al. | 703/2 |

* cited by examiner

FIG. 5
(a) 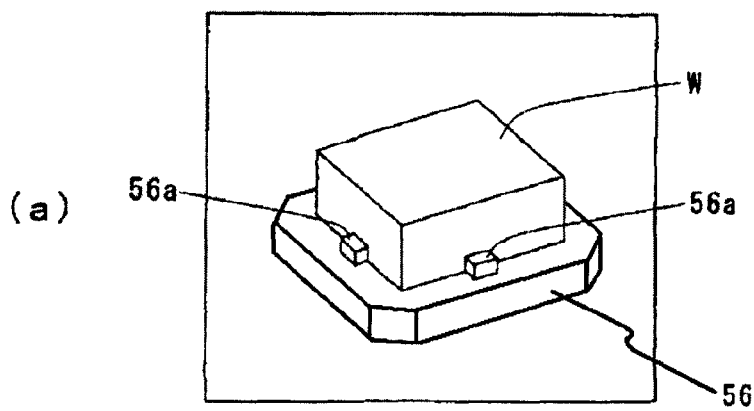
(b) 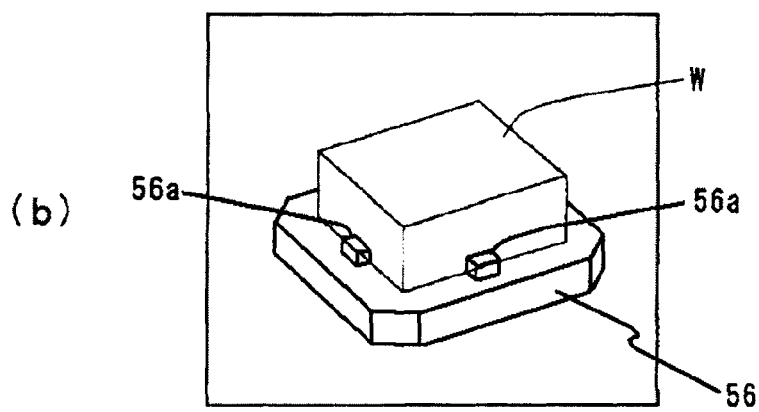
(c) 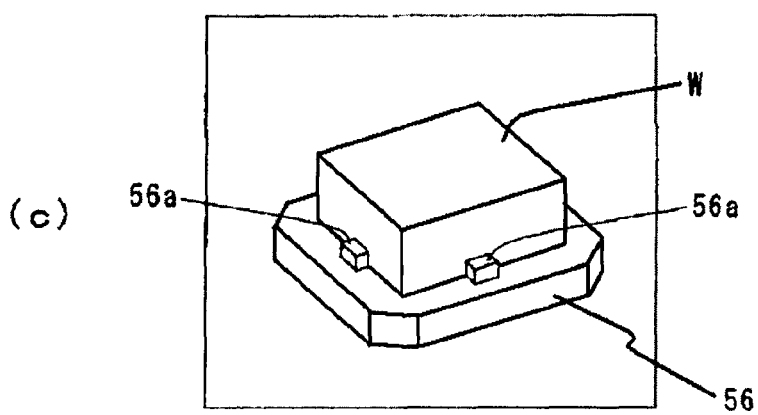

FIG. 6
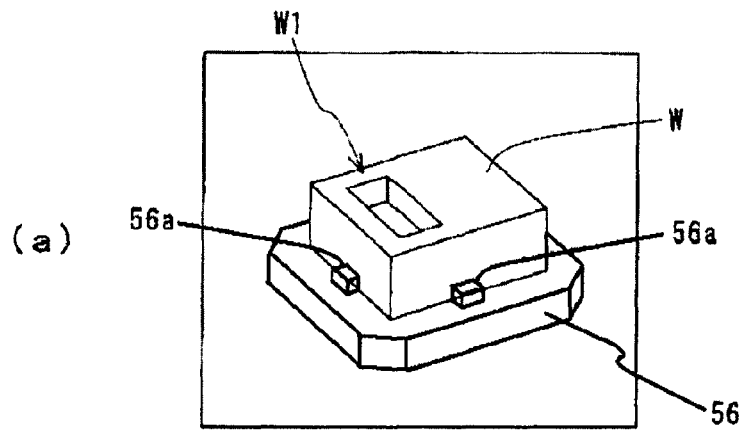
(a)
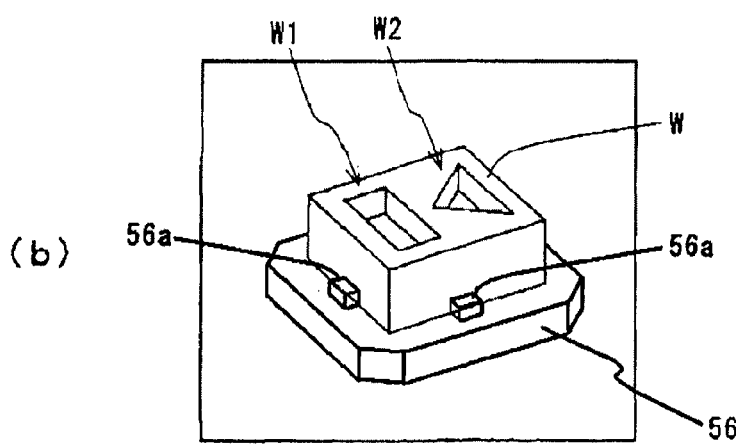
(b)
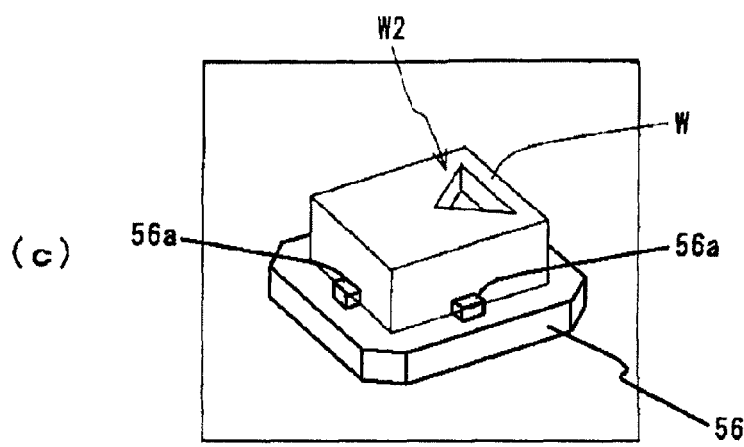
(c)

FIG. 7
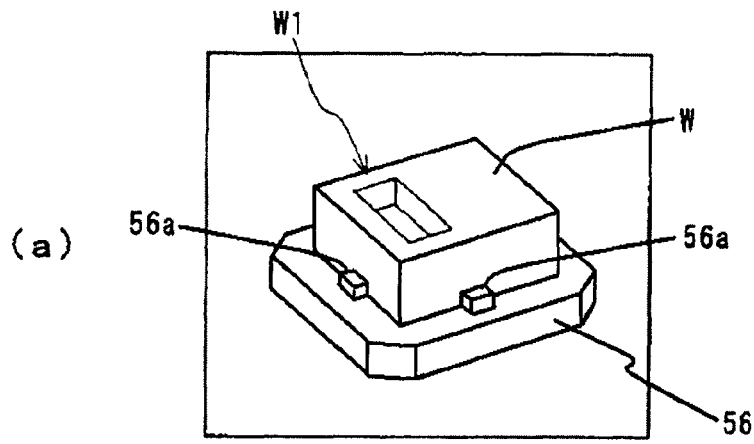
(a)
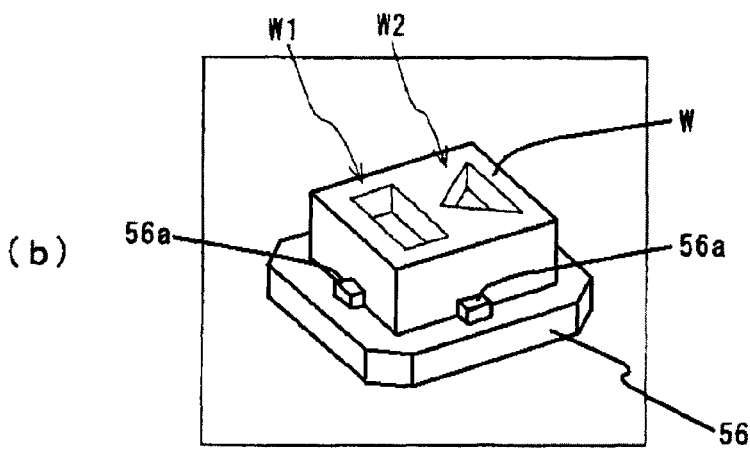
(b)
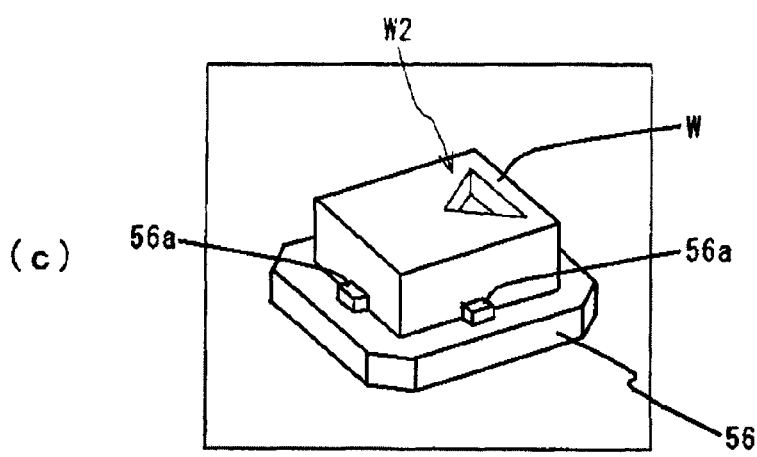
(c)

FIG. 8
(a) 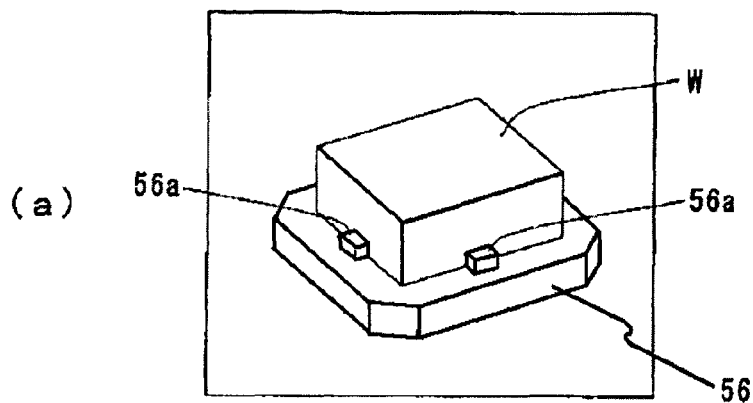
(b) 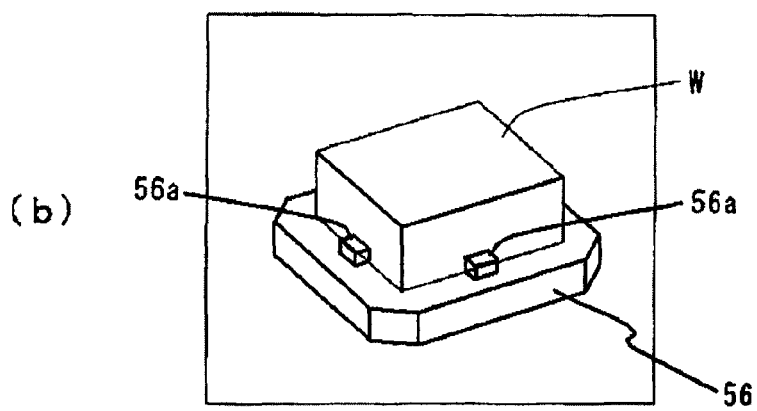
(c) 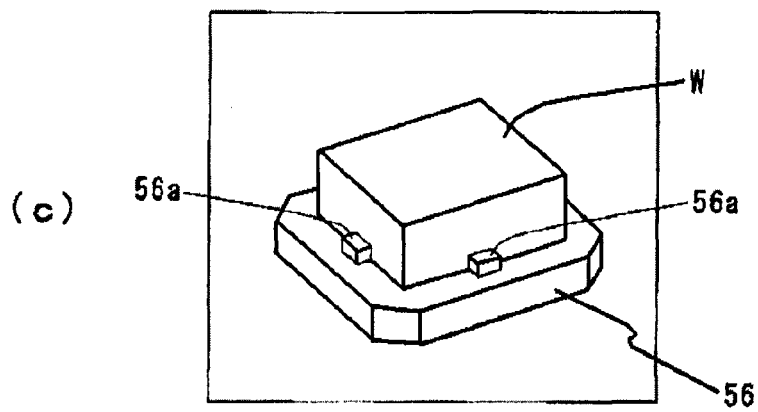

FIG. 10
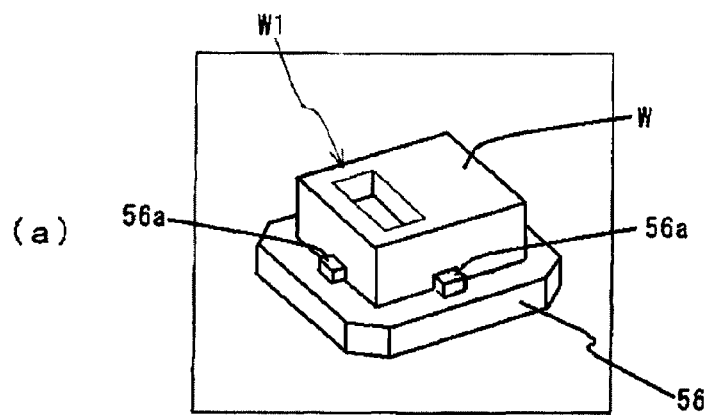
(a)
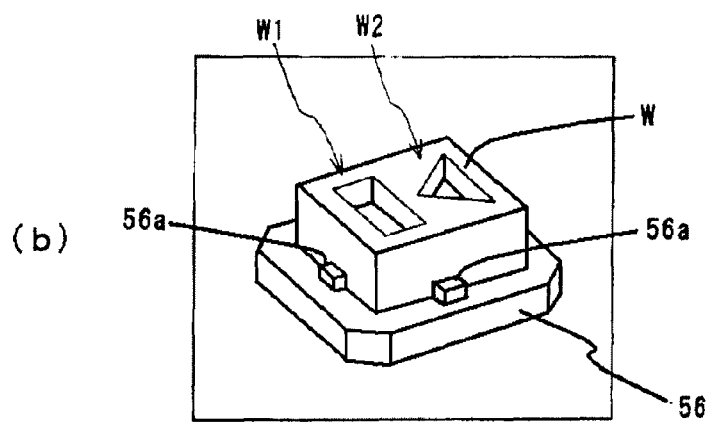
(b)
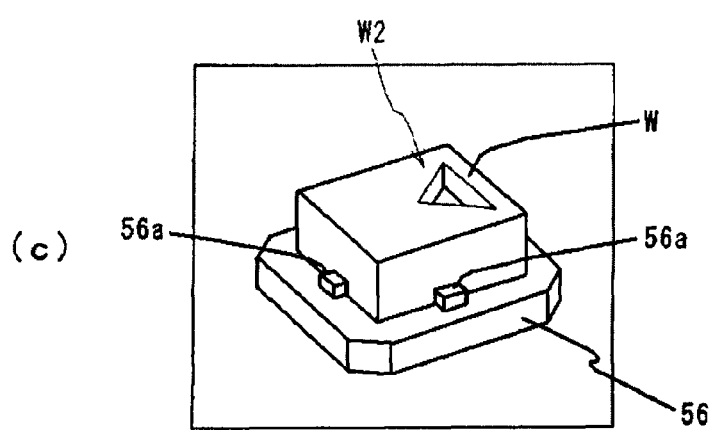
(c)

MACHINING STATE CHECKING METHOD AND MACHINING STATE CHECKING APPARATUS

TECHNICAL FIELD

The present invention relates to a machining state checking method and machining state checking apparatus for checking whether a workpiece or workpiece fixture mounted on a machine tool is shifted, or whether a predetermined machining shape is formed at a portion to be machined of the workpiece by machining.

BACKGROUND ART

In recent years, in the field of machining, automation has advanced for labor saving and improvement of productivity. As a machine tool in which automation, such as automatic control by an NC program, automatic tool change by a tool changer, or automatic pallet change by a pallet changer, has been achieved, the machine tool disclosed in Japanese Unexamined Patent Publication No. 2006-326740 is conventionally known, for example.

In this machine tool, a series of machining operations is performed on the workpiece on the pallet, while tools are changed by the tool changer. When the machining of the workpiece has been completed, the pallet on which the machined workpiece is placed is changed by the pallet changer for another pallet on which an unmachined workpiece is placed, and then a series of machining operations is performed on the unmachined workpiece. Thus, a predetermined number of workpieces are successively machined.

SUMMARY OF INVENTION

Technical Problem

However, in such automated machine tools, typically one operator takes charge of several machine tools. Therefore, the machining state of the workpiece in each machine tool tends to be inadequately monitored, wherein, when a problem occurs during the machining of workpieces, it is difficult for the operator to immediately recognize the problem.

Further, for example, if a tool is not mounted accurately or a wrong tool is mounted when the tool changer changes tools, or if a tool is damaged during machining, a problem is caused that the workpiece cannot be machined into a predetermined shape and the tool interferes with the workpiece or the machine tool structure.

Moreover, if a workpiece fixture for fixing a workpiece loosens during the machining of the workpiece and the workpiece or the workpiece fixture is shifted, not only cannot the workpiece be machined into a predetermined shape, but also the workpiece fixture or the workpiece released from the workpiece fixture may lead to a serious accident.

The present invention has been achieved in view of the above-described circumstances and an object of the invention is to provide a machining state checking method and machining state checking apparatus capable of preventing problems in the machining of workpieces from occurring without the operator being aware thereof by checking whether a workpiece or workpiece fixture mounted on a machine tool is shifted, or whether a predetermined machining shape is formed at a portion to be machined of the workpiece by machining.

Solution to Problem

The present invention, for achieving the above-described object, relates to a machining state checking method for, in a machine tool for machining a portion to be machined of a workpiece fixed by a workpiece fixture to form a predetermined machining shape on the workpiece, checking whether the workpiece or the workpiece fixture is shifted, or whether the predetermined machining shape is formed by machining, the machining state checking method comprising:

an actual image generating step of imaging a pre-machined workpiece, workpiece having the predetermined machining shape formed thereon, or the workpiece fixture, which are fixed on the machine tool, by means of actual imaging means from a predetermined view point, and generating actual two-dimensional image data thereof;

a virtual image generating step of, based on data on a three-dimensional model of the workpiece or workpiece fixture, generating virtual two-dimensional image data of the workpiece, workpiece fixture, or machining shape of the workpiece, the virtual image generating step in which: a three-dimensional space is virtually set; a three-dimensional model of the workpiece including the machining shape, a three-dimensional model of the workpiece excluding the machining shape, a three-dimensional model of the workpiece fixture, or a three-dimensional model of the machining shape of the workpiece is arranged in the virtual three-dimensional space, and simultaneously imaging means having the same condition as that of the actual imaging means is virtually set and arranged; and then virtual two-dimensional image data, which is assumed to be obtained when the workpiece, the workpiece fixture, or the machining shape of the workpiece is imaged by the virtual imaging means from the same view point as that of the actual imaging means, is generated; and a comparing step of comparing the actual two-dimensional image data and virtual two-dimensional image data generated in the actual image generating step and the virtual image generating step, respectively, the comparing step of comparing the portion corresponding to the workpiece, workpiece fixture, or machining shape of the workpiece in the actual two-dimensional image and the virtual two-dimensional image of the workpiece, workpiece fixture, or machining shape of the workpiece, and determining whether they match each other.

This machining state checking method can be appropriately carried out by the following machining state checking apparatus.

That is, the machining state checking apparatus comprising:

actual imaging means for imaging from a predetermined view point a pre-machined workpiece, workpiece having a predetermined machining shape formed thereon, or workpiece fixture, which are fixed on the machine tool, and generating actual two-dimensional image data thereof;

model data storage means for storing data on a three-dimensional model of the workpiece or workpiece fixture;

virtual image generating means for generating virtual two-dimensional image data of the workpiece, workpiece fixture, or machining shape of the workpiece, based on the model data stored in the model data storage means, the virtual image generating means in which: a three-dimensional space is virtually set; the three-dimensional model of the workpiece including the machining shape, the three-dimensional model of the workpiece excluding the machining shape, the three-dimensional model of the workpiece fixture, or the three-dimensional model of the machining shape of the workpiece is arranged in the virtual three-dimensional space, and simultaneously imaging means having the same condition as that of the actual imaging means is virtually set and arranged; and then virtual two-dimensional image data, which is assumed to be obtained when the workpiece, the workpiece fixture, or the machining shape of the workpiece is imaged by the virtual imaging means from the same view point as that of the actual imaging means, is generated; and comparing means for comparing the actual two-dimensional image data and virtual two-dimensional image data generated by the actual image generating means and the virtual image generating means, respectively, the comparing means for comparing the portion corresponding to the workpiece, workpiece fixture, or machining shape of the workpiece in the actual two-dimensional image and the virtual two-dimensional image of the workpiece, workpiece fixture, or machining shape of the workpiece, and determining whether they match each other.

According to this machining state checking apparatus, first of all, the actual imaging means images from a predetermined view point a pre-machined (unmachined) workpiece, workpiece having a predetermined machining shape formed thereon, or the workpiece fixture, which are fixed on the machine tool, and generates actual two-dimensional image data thereof. Simultaneously, the virtual image generating means generates virtual two-dimensional image data of the workpiece, workpiece fixture, or machining shape of the workpiece, based on the model data stored in the model data storage means.

This virtual two-dimensional image data is image data which is assumed to be obtained as follows: a three-dimensional space is virtually set; the three-dimensional model of the workpiece including the machining shape, the three-dimensional model of the workpiece excluding the machining shape, the three-dimensional model of the workpiece fixture, or the three-dimensional model of the machining shape of the workpiece is arranged in the virtual three-dimensional space, and simultaneously imaging means having the same condition as that of the actual imaging means (for example, having the same camera parameters) is virtually set and arranged; and the workpiece, the workpiece fixture, or the machining shape of the workpiece is imaged by the virtual imaging means from the same view point as that of the actual imaging means.

When the actual two-dimensional image data and the virtual two-dimensional image data have been generated by the actual imaging means and the virtual imaging means, respectively, the generated actual and virtual two-dimensional image data are compared with each other by the comparing means. Specifically, the portion corresponding to the workpiece, workpiece fixture, or machining shape of the workpiece in the actual two-dimensional image and the virtual two-dimensional image of the workpiece, workpiece fixture, or machining shape of the workpiece are compared, and the determination whether they match each other is made.

Here, the determination whether they match each other is made by, for example, checking whether the intensity value of each pixel in the actual two-dimensional image data and the intensity value of each pixel in the virtual two-dimensional image data are the same. Alternatively, the determination whether they match each other is made by checking, after extracting an edge of the workpiece, workpiece fixture, or machining shape of the workpiece from each of the actual two-dimensional image data and virtual two-dimensional image data, whether the positions and lengths of the extracted edges are the same.

When determining that they match each other, it is confirmed that the workpiece or workpiece fixture mounted on the machine tool is not shifted, or that the predetermined machining shape is formed at the portion to be machined of the workpiece by machining. By contrast, when determining that they do not match each other, it is confirmed that the workpiece or workpiece fixture mounted on the machine tool is shifted, or that the predetermined machining shape is not formed at the portion to be machined of the workpiece by machining. When being confirmed that the workpiece or the workpiece fixture is shifted, or that the predetermined machining shape is not formed on the workpiece, a message informing of this confirmation is displayed or the machining is stopped, for example.

Thus, according to the machining state checking method and machining state checking apparatus of the present invention, since it is possible to check whether the workpiece or the workpiece fixture is shifted, the workpiece can be prevented from not being machined into the predetermined shape, or a serious accident can be prevented from being caused by the position shift of the workpiece or workpiece fixture.

Further, since it is possible to check whether the predetermined machining shape is formed by machining, the workpiece can be prevented from not being machined into the predetermined shape, or the tool can be prevented from interfering with the workpiece or machine tool structure, for example, in the case where a tool is not mounted accurately or a wrong tool is mounted when the tool changer changes tools, or where a tool is damaged during machining.

The comparing means may be provided with: an edge extracting section for, based on the virtual two-dimensional image data generated by the virtual image generating means, extracting an edge corresponding to at least the contour line of the workpiece, workpiece fixture, or machining shape of the workpiece from the edges in the virtual two-dimensional image; an edge detecting section for, based on the actual two-dimensional image data generated by the actual image generating means, detecting an edge corresponding to at least the contour line of the workpiece, workpiece fixture, or machining shape of the workpiece from the actual two-dimensional image; and an edge comparing section for comparing the edge extracted by the edge extracting section and the edge detected by the edge detecting section, and determining whether they match each other.

When configured in this way, it is possible to make the processing time shorter, compared with the case where all the edges of the workpiece, workpiece fixture, or machining shape of the workpiece are extracted from the virtual two-dimensional image, or where all the edges of the workpiece, workpiece fixture, or machining shape of the workpiece are detected from the actual two-dimensional image. Thereby, it is possible to check in shorter time whether the workpiece or the workpiece fixture is shifted, or whether the predetermined machining shape is formed by machining.

Further, it may be configured so that the comparing means includes a detection area setting section for, based on the edge extracted by the edge extracting section, setting a detection area including the edge and having a given width along the extracted edge, and the edge detecting section detects an edge existing in the detection area as the edge corresponding to the contour line on the actual two-dimensional image, based on the detection area set by the detection area setting section and the actual two-dimensional image data generated by the actual imaging means.

The actual two-dimensional image includes a lot of noise, and includes many component images compared with the virtual two-dimensional image. Therefore, when configured to narrow down the edge detection area on the actual two-dimensional image by setting the detection area, it is possible to make the edge detection process easy, and to improve the accuracy of the edge detection to check, with higher accuracy, whether the workpiece or the workpiece fixture is shifted, or whether a predetermined machining shape is formed by machining.

The edge comparing section may be configured to determine that the edge detected by the edge detecting section and the edge extracted by the edge extracting section match each other when the relationship between the sum of the length of the edge detected by the edge detecting section and the sum of the length of the edge extracted by the edge extracting section satisfies a predetermined standard.

Effect of the Invention

As described above, according to the machining state checking method and machining state checking apparatus of the present invention, it is possible to check whether the workpiece or the workpiece fixture is shifted, or whether the predetermined machining shape is formed at the portion to be machined of the workpiece by machining. Thereby, it is possible to prevent problems in the machining of workpieces from occurring without the operator being aware thereof.

BRIEF DESCRIPTION OF DRAWINGS

FIG. 5 is an illustration showing examples of a virtual image of the embodiment.

FIG. 6 is an illustration showing examples of the virtual image of the embodiment.

FIG. 7 is an illustration showing examples of the virtual image of the embodiment.

FIG. 8 is an illustration showing examples of the edge extraction of the embodiment.

FIG. 10 is an illustration showing examples of the edge extraction of the embodiment.

DESCRIPTION OF EMBODIMENT

Figure 1:
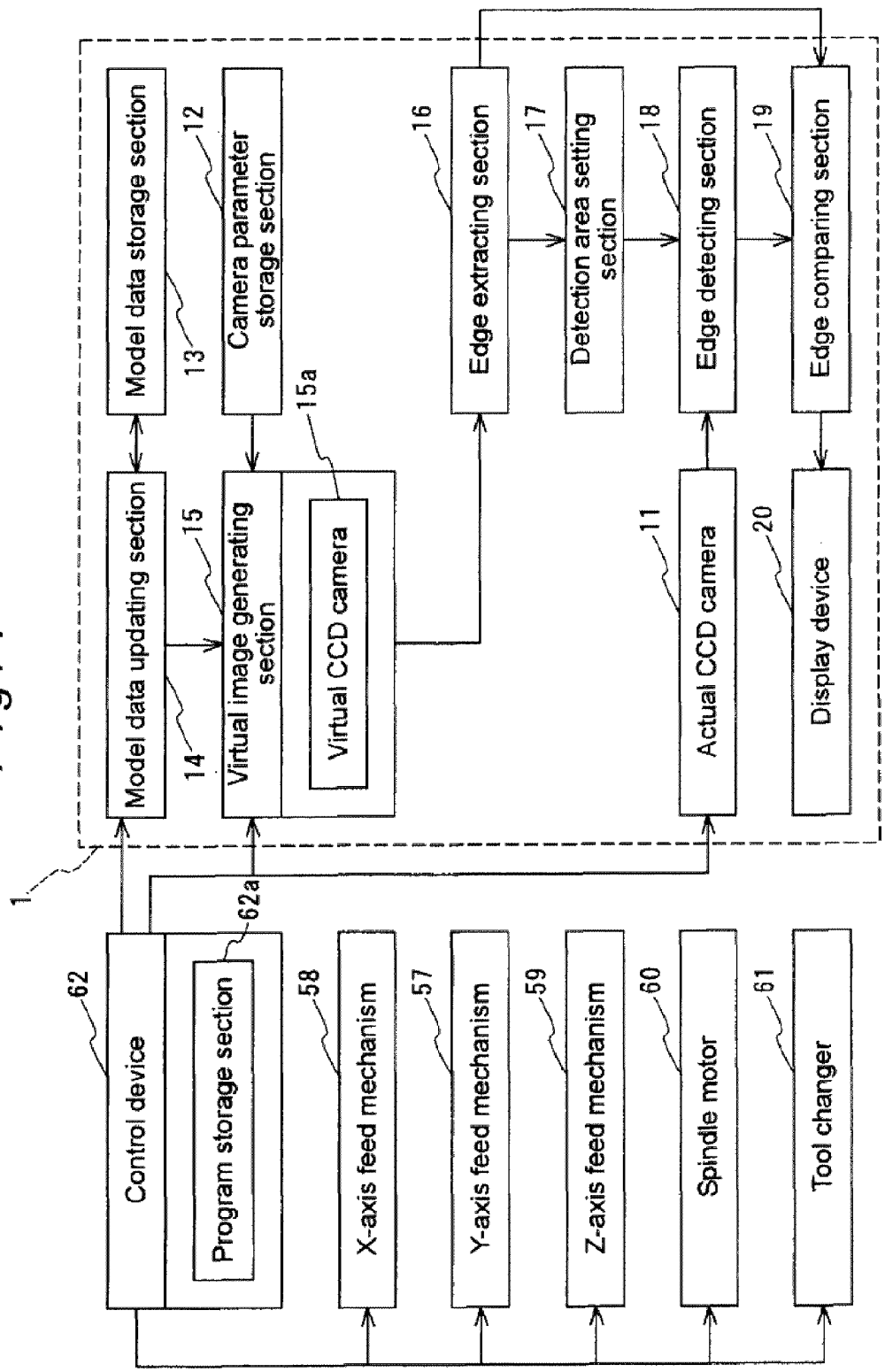
FIG. 1 is a block diagram showing a schematic configuration of a machining state checking apparatus and other components according to one embodiment of the present invention.

Hereinafter, a specific embodiment of the present invention will be explained with reference to the accompanying drawings. FIG. 1 is a block diagram showing a schematic configuration of a machining state checking apparatus and other components according to one embodiment of the present invention, and FIG. 2 is a perspective view showing a schematic configuration of a machine tool provided with the machining state checking apparatus of the embodiment.

Figure 2:
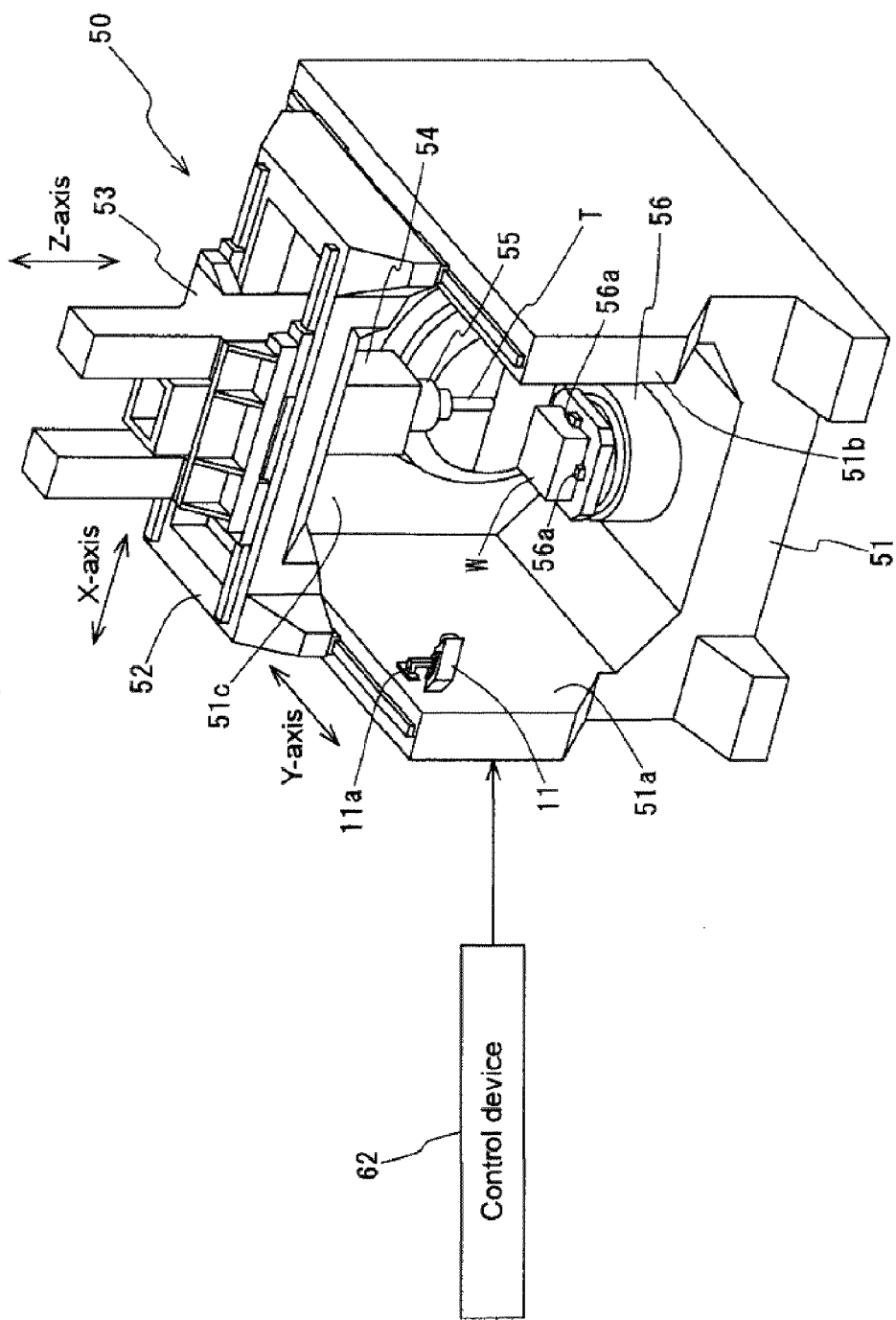
FIG. 2 is a perspective view showing a schematic configuration of a machine tool provided with the machining state checking apparatus of the embodiment.

As shown in FIG. 1, a machining state checking apparatus 1 of the present invention includes an actual CCD camera 11, a camera parameter storage section 12, a model data storage section 13, a model data updating section 14, a virtual image generating section 15, an edge extracting section 16, a detection area setting section 17, an edge detecting section 18, an edge comparing section 19, and a display device 20, and is provided in a machine tool 50 called a machining center as shown in FIG. 2, for example.

Here, first of all, the machine tool 50 is explained. As shown in FIGS. 1 and 2, the machine tool 50 is provided with: a bed 51; a first saddle 52 which is disposed on the bed 51 and which can move freely in a horizontal back-and-forth direction (Y-axis direction); a second saddle 53 which is disposed on the first saddle 52 and can move freely in a horizontal side-to-side direction (X-axis direction); a spindle head 54 which is supported by the second saddle 53 and which can move freely in the vertical direction (Z-axis direction); a spindle 55 which is supported by the spindle head 54 so that its axis is parallel to the Z-axis and so as to be rotatable about its axis, and to the lower end portion of which tools T are mounted; a table 56 which is disposed to the bed 51, and on which a workpiece W is placed; a Y-axis feed mechanism 57, X-axis feed mechanism 58 and Z-axis feed mechanism 59 for respectively moving the first saddle 52, second saddle 53 and spindle head 54 in their respective moving directions; a spindle motor 60 for rotating the spindle 55 about its axis; a tool changer 61 for changing a tool T mounted to the spindle 55 for a new tool T; and a control device 62 for controlling the operations of the feed mechanisms 57, 58 and 59, spindle motor 60, and tool changer 61.

Figure 3:
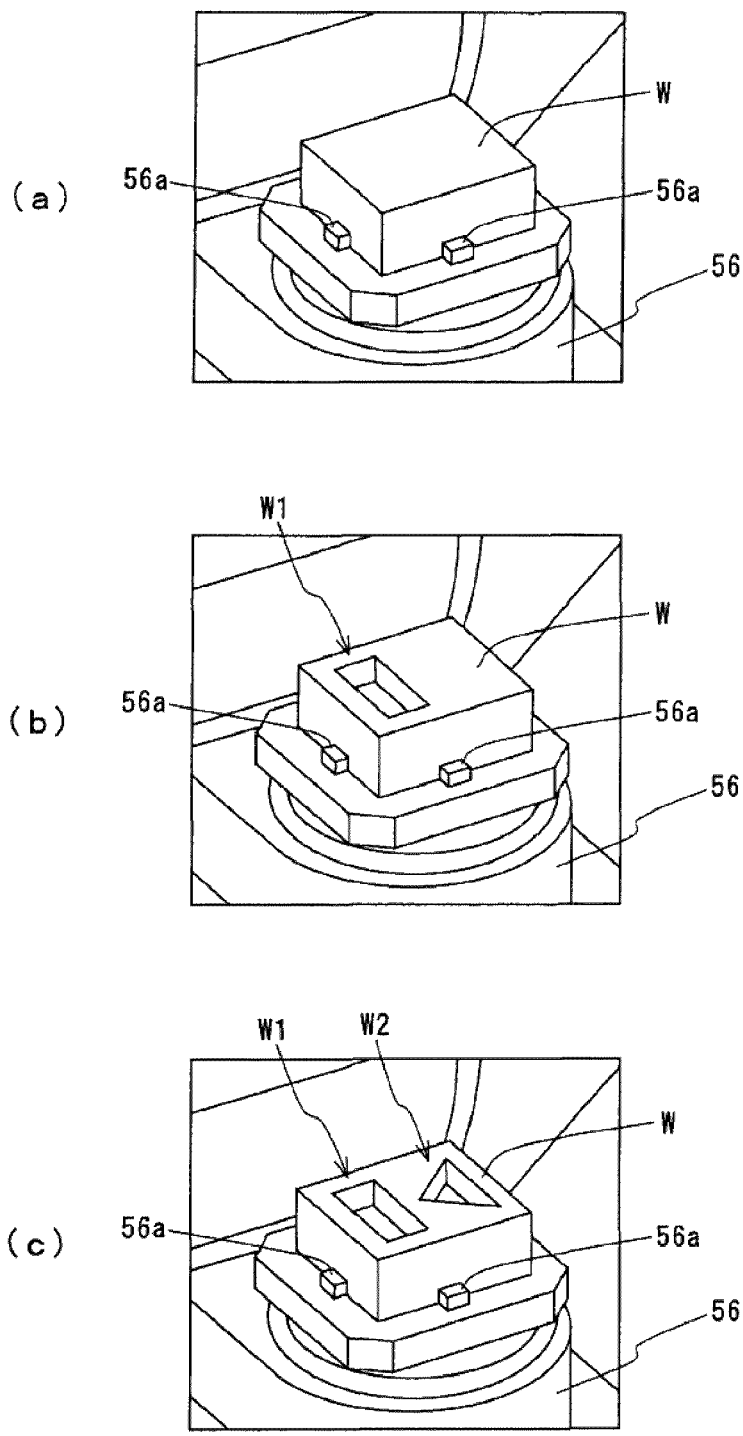
FIG. 3 is an illustration showing examples of an actual image of the embodiment.

The bed 51 has a configuration in which side walls 51a, 51b and 51c are provided on the right, left and back sides thereof, respectively. The first saddle 52 is disposed on the upper portions of the right and left side walls 51a and 51b, and the table 56 is disposed to the back side wall 51c. On the upper surface of the table 56, for example, a rectangular workpiece W is fixed by a plurality of fixtures 56a provided on the table 56. In the upper surface of the workpiece W, as shown in FIG. 3, a rectangular recessed portion W1 is formed as a machining shape in a first process, and a triangular recessed portion W2 is formed as a machining shape in a second process.

The control device 62 includes a program storage section 62a in which a previously generated NC program is stored, and controls the feed mechanisms 57, 58 and 59, the spindle motor 60, and the tool changer 61, based on the NC program stored in the program storage section 62a. Specifically, the control device 62 analyzes the NC program block by block, and in turn extracts operation commands related to the moving positions and feed speed of the first saddle 52, second saddle 53 and spindle head 54, related to the rotation speed of the spindle 55, and related to positions and feed speed of the first saddle 52, second saddle 53 and spindle head 54, and related to the rotation speed of the spindle 55, and feedback signals from the feed mechanisms 57, 58 and 59 and the spindle motor 60, the control device 62 controls the feed mechanisms 57, 58 and 59 and the spindle motor 60. Simultaneously, the control device 62 controls the tool changer 61, based on the extracted operation command related to the tool change.

The control device 62 transmits the extracted operation commands to the model data updating section 14. Further, when the operation command related to the tool change is extracted, the control device 62 transmits, to the actual CCD camera 11 and the virtual image generating section 15, a signal related to the tool change, such as the extracted operation command related to the tool change, a signal indicating that the tool change will be carried out, and the like. Furthermore, at the time of starting a series of machining operations and at the time of completing a series of machining operations, the control device 62 transmits a signal indicating the start or completion to the actual CCD camera 11 and the virtual image generating section 15. When receiving an alarm signal from the edge comparing section 19, the control device 62 stops the feed mechanisms 57, 58 and 59 and the spindle motor 60 to stop the machining of the workpiece W.

Next, the machining state checking apparatus 1 is explained. As described above, the machining state checking apparatus 1 includes the actual CCD camera 11, the camera parameter storage section 12, the model data storage section 13, the model data updating section 14, the virtual image generating section 15, the edge extracting section 16, the detection area setting section 17, the edge detecting section 18, the edge comparing section 19, and the display device 20. And a computer functions as the camera parameter storage section 12, the model data storage section 13, the model data updating section 14, the virtual image generating section 15, the edge extracting section 16, and the detection area setting section 17, the edge detecting section 18, and the edge comparing section 19.

As shown in FIG. 2, the actual CCD camera 11 is mounted to the upper portion of the left side wall 51a of the bed 51 via a bracket 11a. The actual CCD camera 11 images a workpiece W fixed on the table 56 and the fixtures 56a and generates two-dimensional image data (actual image data) thereof, and then outputs the generated two-dimensional image data to the edge detecting section 18. Examples of the actual image generated at this time are shown in FIG. 3. FIG. 3(a), FIG. 3(b), and FIG. 3(c) show a pre-machined (unmachined) workpiece W, a workpiece W having a first machining shape (rectangular recessed portion) W1 formed thereon by machining, and a workpiece W having a second machining shape (triangular recessed portion) W2 formed thereon by machining, respectively. In these images, a part of the bed 51 and a part of the table 56 are included in addition to the workpiece W and the fixtures 56a.

The actual CCD camera 11 is configured to image the workpiece W and the fixtures 56a and generate two-dimensional image data thereof when receiving a signal related to the tool change, signal indicating a start of a series of machining operations, or signal indicating a completion of a series of machining operations, which are transmitted from the control device 62.

In the camera parameter storage section 12, intrinsic parameters which are characteristic parameters of the actual CCD camera 11 and extrinsic parameters which represent the position and orientation of the actual CCD camera 11 in the coordinate system of the machine tool 50 are stored. These parameters are previously calculated by a calibration process. The intrinsic parameters include, for example, a principal point coordinate, a scale factor, skewness of the two image axes and the like.

In the model data storage section 13, for example, previously generated data on a three-dimensional model (model data) of the entire machine tool 50 is stored. The model data of the entire machine tool 50 includes model data of the main components of the machine tool 50 such as the bed 51, the first saddle 52, the second saddle 53, the spindle head 54, the spindle 55, and the table 56, model data of the tool T mounted to the spindle 55, model data of the workpiece W fixed on the table 56, and model data of the fixtures 56a provided on the table 56 for fixing the workpiece W, and the model data of the components, tool T, workpiece W, and fixtures 56a are related to one another.

The model data updating section 14 reads out the model data of the entire machine tool 50 stored in the model data storage section 13, and simultaneously receives the operation command transmitted from the control device 62. The model data updating section 14 then updates the model data of the entire machine tool 50 in the model data storage section 13, and transmits the updated model data to the virtual image generating section 15. Specifically, the model data updating section 14, based on the received operation command and the model data of the entire machine tool 50 stored in the model data storage section 13, generates model data of the entire machine tool 50 in which the first saddle 52, the second saddle 53, and the spindle head 54 are in a state where they were moved according to the operation command. The generated model data is stored in the model data storage section 13, and the model data in the model data storage section 13 is updated. If there is an overlap portion between the model data of the tool T and the model data of the workpiece W when the first saddle 52, the second saddle 53, and the spindle head 54 are moved, the overlap area is calculated as a cutting area, and the model data of the workpiece W is generated so that the cutting area is removed from the workpiece W, and the model data of the entire machine tool 50 is updated using such model data of the workpiece W.

The virtual image generating section 15 generates, by a computer process, two-dimensional image data (virtual image data) of the workpiece W and fixtures 56a, workpiece W, fixtures 56a, machining shape W1 of the workpiece W, machining shapes W1 and W2, or machining shape W2, based on the parameters stored in the camera parameter storage section 12 and the model data transmitted from the model data updating section 14.

Figure 4:
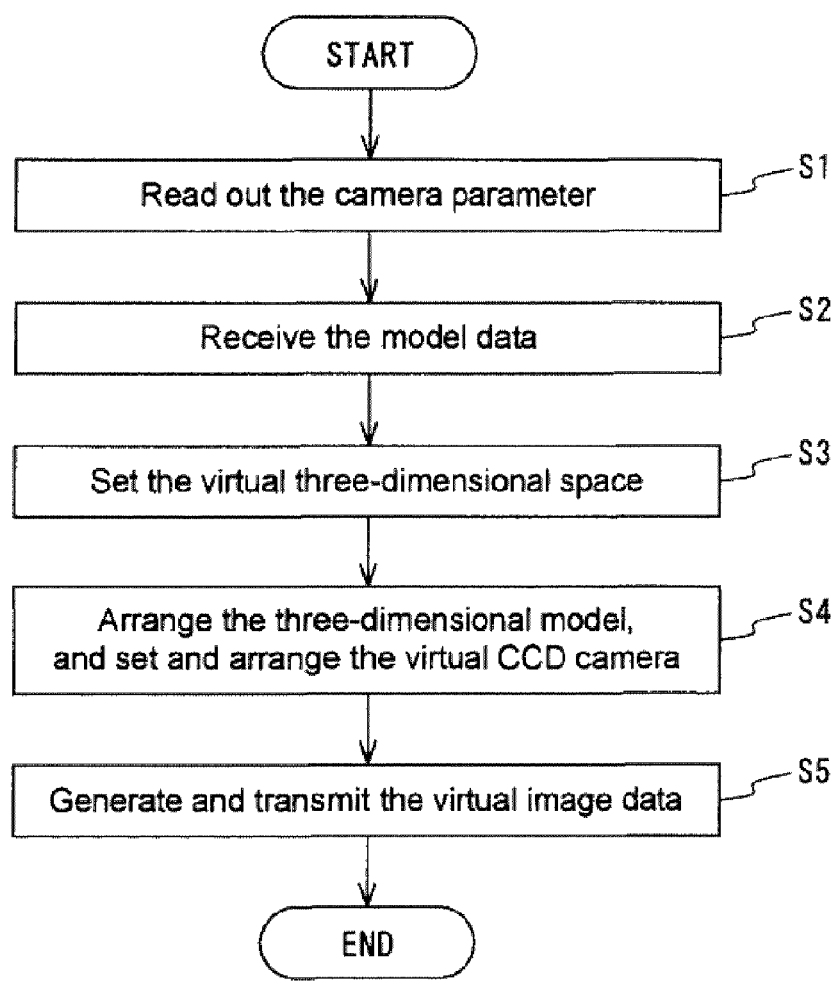
FIG. 4 is a flow chart showing a series of processes in a model data updating section of the embodiment.

Specifically, the virtual image generating section 15 is configured to carry out a series of processes as shown in FIG. 4 when receiving a signal related the tool change, signal indicating a start of a series of machining operations, or signal indicating a complement of a series of machining operations, which are transmitted from the control device 62. First, the virtual image generating section 15 reads out the parameters stored in the camera parameter storage section 12 (step S1), and then receives the model data transmitted from the model data updating section 14 (step S2).

Next, the virtual image generating section 15 virtually sets a three-dimensional space having the same coordinate system as the coordinate system of the machine tool 50 (step S3). Thereafter, the virtual image generating section 15 arranges, in the set virtual three-dimensional space, any one of a three-dimensional model of the workpiece W excluding the machining shapes W1 and W2, three-dimensional model of the workpiece W including one or both of the machining shapes W1 and W2, three-dimensional model of the fixtures 56a, and three-dimensional model of one or both of the machining shapes W1 and W2 of the workpiece W, based on the read parameters and the received model data (the model data on the workpiece W and fixtures 56a in the model data of the entire machine tool 50), and simultaneously sets and arranges a virtual CCD camera 15a (step S4).

It is noted that the virtual CCD camera 15a is arranged at the same position and in the same orientation as the actual CCD camera 11, based on the read extrinsic parameters. Therefore, the view point of the virtual CCD camera 15a matches that of the actual CCD camera 11. Further, the intrinsic parameters of the virtual CCD camera 15a are set to be the same as the intrinsic parameters of the actual CCD camera 11, based on the read intrinsic parameters. Therefore, the condition of the virtual CCD camera 15a matches that of the actual CCD camera 11.

Thereafter, two-dimensional image data which is assumed to be obtained when one or both of the workpiece W and fixtures 56a represented by three-dimensional model, and one or both of the machining shapes W1 and W2 represented by three-dimensional model are imaged by the virtual CCD camera 15a is generated, and the generated two-dimensional image data is transmitted to the edge extracting section 16 (step S5).

Examples of the virtual image generated at this time are shown in FIGS. 5 to 7. FIG. 5(a), FIG. 5(b) and FIG. 5(c) show an image of the workpiece W and fixtures 56a, an image of the workpiece W, and an image of the fixtures 56a, respectively. FIG. 6(a), FIG. 6(b) and FIG. 6(c) show an image of the workpiece W having the machining shape W1 formed thereon, an image of the workpiece W having the machining shapes W1 and W2 formed thereon, and an image of the workpiece W having the machining shape W2 formed thereon, respectively. FIG. 7(a), FIG. 7(b) and FIG. 7(c) show an image of the machining shape W1 of the workpiece W, an image of the machining shapes W1 and W2 of the workpiece W, and an image of the machining shape W2 of the workpiece W, respectively. FIGS. 5(a) and 5(b) show each an image of a pre-machined workpiece W or an image of a workpiece W with the machining shapes W1 and W2 not being shown. FIG. 6(a) shows an image of a workpiece W after forming the machining shape W1 thereon by machining or an image of a workpiece W with the machining shape W2 not being shown, and FIG. 6(c) shows an image of a workpiece W after forming the machining shape W2 thereon by machining or an image of a workpiece W with the machining shape W1 not being shown. It is noted that, in these figures, the shapes represented by solid line indicate the shapes obtained as virtual images.

The edge extracting section 16 extracts, based on the virtual image data transmitted from the virtual image generating section 15, one or more edges corresponding to the contour line of the workpiece W and fixtures 56a, workpiece W, fixtures 56a, machining shape W1 of the workpiece W, machining shapes W1 and W2 of the workpiece W, and machining shape W2 of the workpiece W from the edges in this virtual image.

Figure 9:
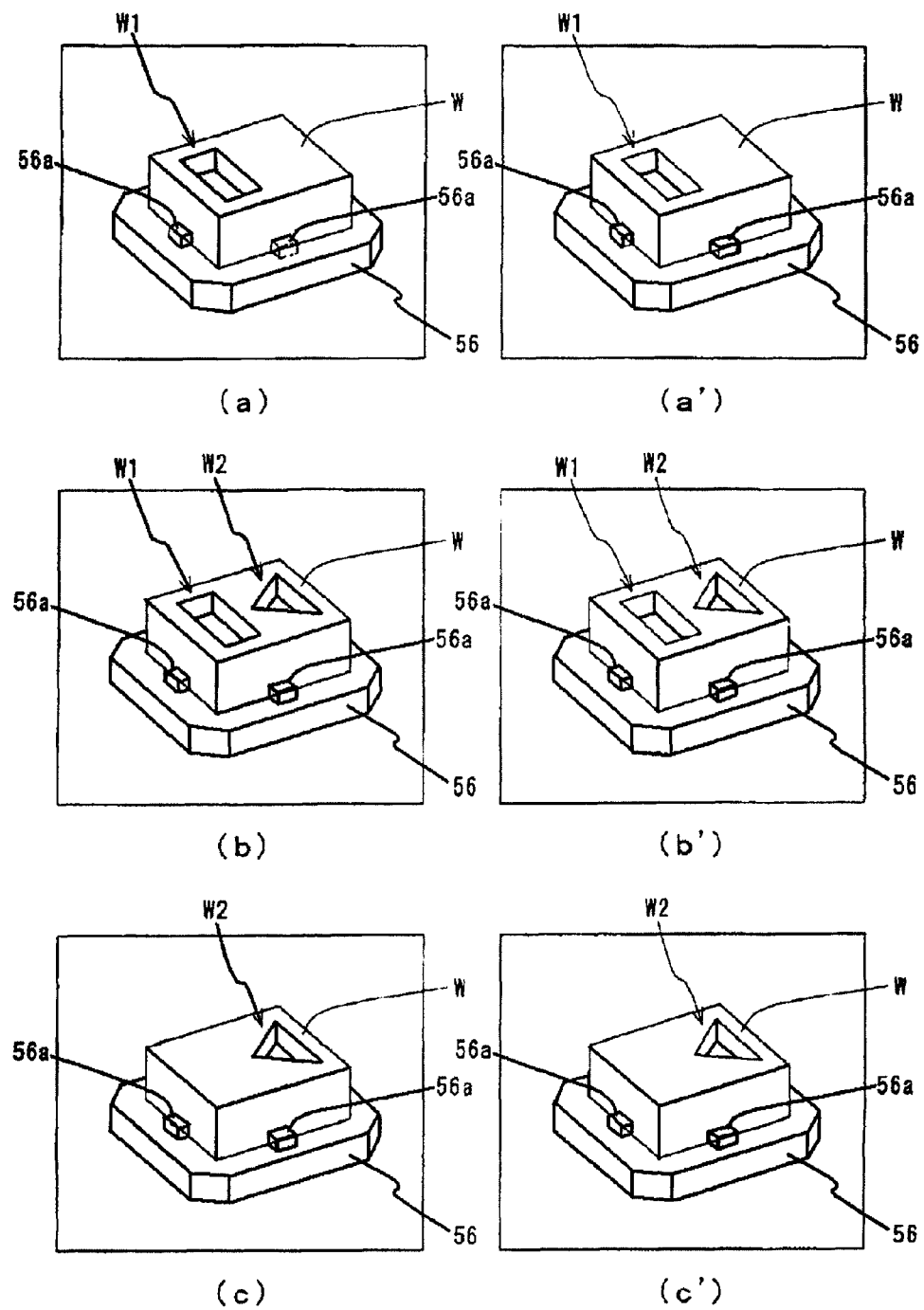
FIG. 9 is an illustration showing examples of the edge extraction of the embodiment.

For example, in the case of the image shown in FIG. 5(a), the edge (contour line) of the workpiece W and fixtures 56a is extracted as shown in FIG. 8(a); in the case of the image shown in FIG. 5(b), the edge of the workpiece W is extracted as shown in FIG. 8(b); and in the case of the image shown in FIG. 5(c), the edges of the fixtures 56a are extracted as shown in FIG. 8(c). In the case of the image shown in FIG. 6(a), the edge of the workpiece W is extracted as shown in FIG. 9(a) or the edges of the workpiece W and machining shape W1 are extracted as shown in FIG. 9(a'); in the case of the image shown in FIG. 6(b), the edge of the workpiece W is extracted as shown in FIG. 9(b) or the edges of the workpiece W and machining shapes W1 and W2 are extracted as shown in FIG. 9(b'); and in the case of the image shown in FIG. 6(c), the edge of the workpiece W is extracted as shown in FIG. 9(c) or the edges of the workpiece W and machining shape W2 are extracted as shown in FIG. 9(c'). In the case of the image shown in FIG. 7(a), the edge of the machining shape W1 is extracted as shown in FIG. 10(a); in the case of the image shown in FIG. 7(b), the edges of the machining shapes W1 and W2 are extracted as shown in FIG. 10(b); and in the case of the image shown in FIG. 7(c), the edge of the machining shape W2 is extracted as shown in FIG. 10(c). It is noted that, in these figures, the shapes represented by solid line indicate the extracted edges.

Figure 11:
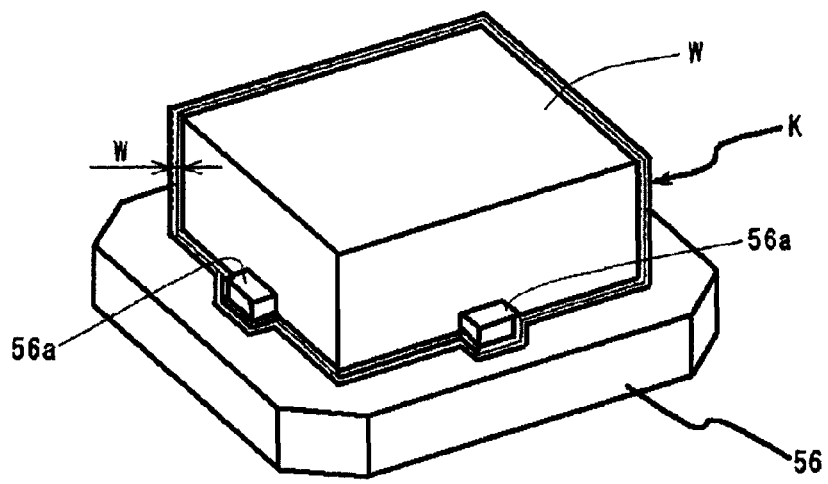
FIG. 11 is an illustration showing an example of the detection area setting of the embodiment.

Based on the edge extracted by the edge extracting section 16, the detection area setting section 17 sets a detection area including the extracted edge and having a given width, along the extracted edge. This detection area is set by, for example, offsetting the extracted edge to both sides thereof. For example, when such edge as represented by solid line in FIG. 8(a), is extracted, such detection area K as represented by broken line in FIG. 11 is set. Further, for example, when such edges as represented by solid line in FIG. 9(a') are extracted, although not particularly shown, a detection area is set to each of the edges of the workpiece W and machining shape W1. The specific value of the given width (indicated by reference character W in FIG. 11) depends on how much position shift is detected. To give an example, it is 0.5 mm.

Based on the detection area set by the detection area setting section 17 and the actual image data output from the actual CCD camera 11, the edge detecting section 18 detects an edge existing in the detection area on the actual image as the edge corresponding to the contour line of the workpiece W and fixtures 56a, workpiece W, fixtures 56a, machining shape W1 of the workpiece W, machining shapes W1 and W2 of the workpiece W, or machining shape W2 of the workpiece W.

Figure 12:
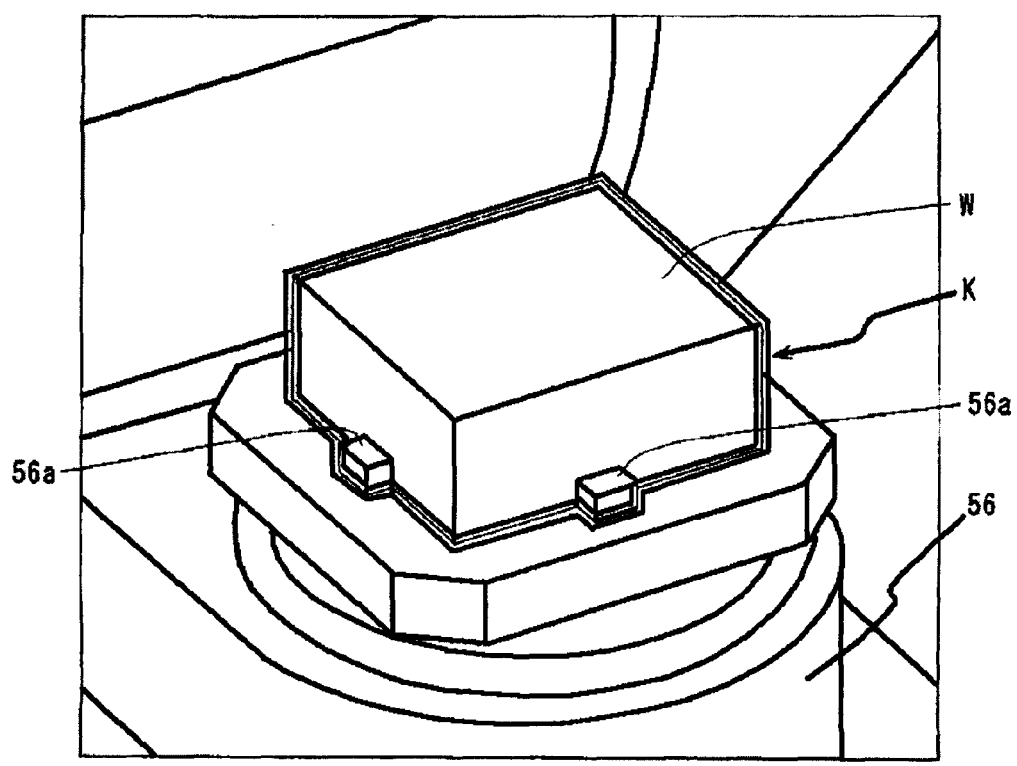
FIG. 12 is an illustration showing an example of the edge detection of the embodiment.
Figure 13:
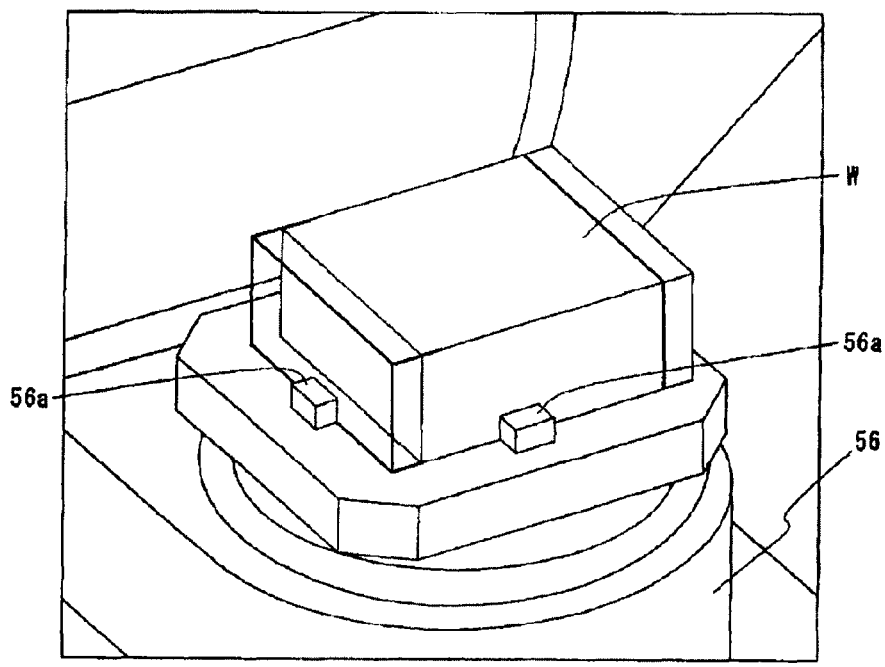
FIG. 13 is an illustration showing a state where a workpiece is shifted from its correct position.
Figure 14:
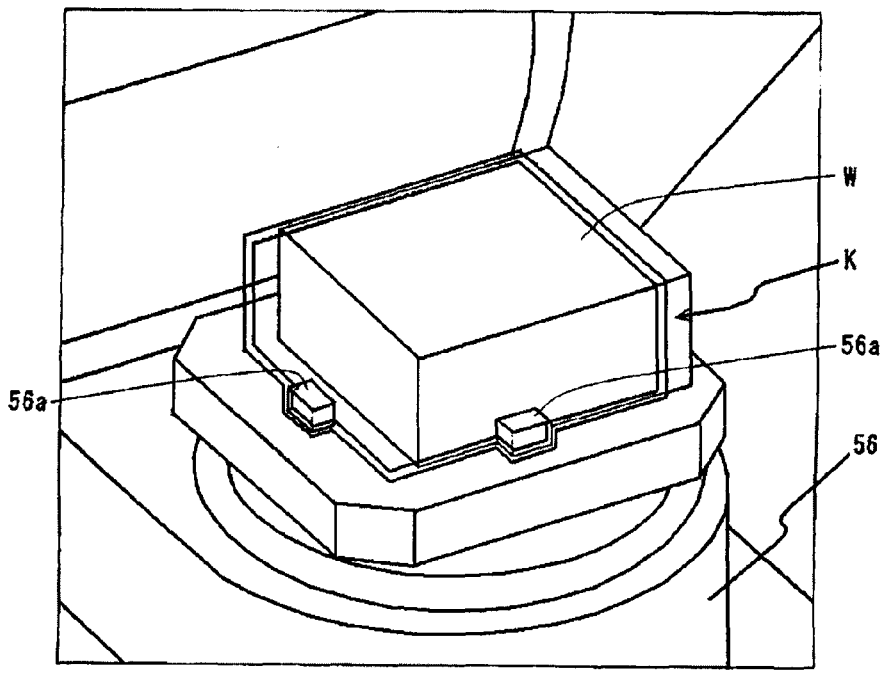
FIG. 14 is an illustration showing an example of the edge detection of the embodiment.

For example, when the workpiece W and the fixtures 56a are in their respective correct positions, an edge in the detection area K is detected as shown in FIG. 12. When the workpiece W is shifted as shown in FIG. 13, an edge in the detection area K is detected as shown in FIG. 14. It is noted that the detected edge is represented by solid line in FIGS. 12 and 14.

The edge comparing section 19 compares the edge extracted by the edge extracting section 16 and the edge detected by the edge detecting section 18, and determines whether they match each other. Specifically, the determination is made depending on whether the relationship between the sum of the length of the edge extracted by the edge extracting section 16 and the sum of the length of the edge detected by the edge detecting section 18 satisfies a predetermined standard.

For example, when setting the sum of the length of the extracted edge, the sum of the detected edge, and the predetermined standard to P, Q, and R, respectively, in the case where the relationship that the value found from an equation of (Q/P)×100 is equal or more than R(%) is satisfied, the determination is made that the extracted edge and the detected edge match each other. Similarly to the given width, the specific value of the predetermined standard R depends on how much position shift is detected. To give an example, it is 80%.

The edge comparing section 19 displays an alarm image on the display device 20, and transmits an alarm signal to the control device 62 to stop the machining of the workpiece W when determining that the extracted edge and the detected edge do not match each other. On the other hand, the edge comparing section 19 allows the machining to continue when determining that the extracted edge and the detected edge match each other.

According to the machining state checking apparatus 1 of the present invention configured above, first of all, the camera parameters of the actual CCD camera 11 are stored in the camera parameter storage section 12, and the model data of the entire machine tool 50 is stored in the model data storage section 13.

When an unmachined workpiece W is fixed on the table 56 by the fixtures 56a, the workpiece W and the fixtures 56a are imaged by the actual CCD camera 11 and the actual image data thereof is generated before starting the machining (see FIG. 3(a)). Simultaneously, virtual image data of, for example, the workpiece W and fixtures 56a is generated by the virtual image generating section 15, based on the parameters in the camera parameter storage section 12 and the model data in the model data storage section 13 which is received from the model data updating section 14 (see FIG. 5).

Thereafter, an edge corresponding to the contour line of the workpiece W and fixtures 56a is extracted by the edge extracting section 16 from the edges in the generated virtual image, and a detection area including the extracted edge and having a given width is set along the extracted edge by the detection area setting section 17. An edge corresponding to the contour line of the workpiece W and fixtures 56a is detected by the edge detecting section 18, based on the set detection area and the generated actual image data.

When the edge has been detected from the actual image, the edge comparing section 19 compares the detected edge and the edge extracted by the edge extracting section 16, and determines whether they match each other. When determining that they do not match each other (that is, one or both of the workpiece W and fixtures 56a is shifted from their respective correct positions), the machining of the workpiece W is stopped by an alarm process. When determining that they match each other, the machining of the workpiece W is started and the workpiece W is actually machined, and simultaneously the model data is updated by the model data updating section 14.

Thereafter, when the tool is changed after the first machining shape W1 is formed by machining, actual image data of the workpiece W and fixtures 56a is generated by the actual CCD camera 11 similarly to the above (see FIG. 3(b)). Simultaneously, virtual image data of the workpiece W and fixtures 56a, and machining shape W1 of the workpiece W are generated by the virtual image generating section 15 (see FIGS. 5(a) and 7(a), or FIGS. 5(c) and 6(c), for example).

Then, similarly to the above, an edge is extracted from the virtual image, an edge is detected from the actual image, and they are compared with each other. When the edges do not match each other, the determination is made that one or both of the workpiece W and fixtures 56a is shifted from their respective correct positions, or that the machining shape W1 is not formed correctly by machining, thereby the machining of the workpiece W is stopped by an alarm process. When the determination is made that the edges match each other, the machining of the workpiece W is continued and the second machining shape W2 is formed by machining. Simultaneously, the model data is updated by the model data updating section 14.

When a series of machining operations is completed after the machining shape W2 is formed by machining, actual image data of the workpiece W and fixtures 56a is generated by the actual CCD camera 11 similarly to the above (see FIG. 3(c)). Simultaneously, virtual image data of the workpiece W and fixtures 56a, and machining shapes W1 and W2 of the workpiece W or machining shape W2 of the workpiece W are generated by the virtual image generating section 15 (see FIGS. 5(a) and 7(b) or 7(c), or FIGS. 5(c) and 6(b) or 6(c), for example).

Thereafter, similarly to the above, an edge is extracted from the virtual image, an edge is detected from the actual image, and they are compared with each other. When the edges do not match each other, the determination is made that one or both of the workpiece W and fixtures 56a is shifted from their respective correct positions, or that the machining shape W2 is not formed correctly by machining, thereby an alarm image is displayed.

Thus, according to the machining state checking apparatus 1 of the present invention, since it is possible to check whether the workpiece W or the fixtures 56a are shifted, the workpiece W can be prevented from not being machined into a predetermined shape, or a serious accident can be prevented from being caused by the position shift of the workpiece W or fixtures 56a.

Since it is possible to check whether the predetermined machining shapes W1 and W2 are formed by machining, for example, if a tool T is not mounted accurately or a wrong tool T is mounted when the tool changer 61 changes tools, or if a tool T is damaged during machining, the workpiece W can be prevented from not being machined into a predetermined shape, or the tool T can be prevented from interfering with the workpiece W or the structure of the machine tool 50.

Since it is configured so that only edge corresponding to the contour line of the workpiece W and fixtures 56a, workpiece W, fixtures 56a, machining shape W1 of the workpiece W, machining shapes W1 and W2 of the workpiece W, or machining shape W2 of the workpiece W is extracted from the edges in the generated virtual image, it is possible to make the processing time shorter compared with the case where all the edges of the workpiece W and fixtures 56a, workpiece W, fixtures 56a, machining shape W1 of the workpiece W, machining shapes W1 and W2 of the workpiece W, or machining shape W2 of the workpiece W are extracted. Thereby, it is possible to check in shorter time whether the workpiece W or the fixtures 56a are shifted, or whether the predetermined machining shapes W1 and W2 are formed by machining.

Further, since it is configured so that a detection area is set and an edge corresponding to the contour line of the workpiece W and fixtures 56a, workpiece W, fixtures 56a, machining shape W1 of the workpiece W, machining shapes W1 and W2 of the workpiece W, or machining shape W2 of the workpiece W is detected from the detection area, it is possible to narrow the edge detection area on the actual two-dimensional image which includes a lot of noise and many component images. Thereby, the edge detecting process can be made easy, or it is possible to improve the accuracy of the edge detection to check, with higher accuracy, whether the workpiece W or the fixtures 56a are shifted, or whether the predetermined machining shapes W1 and W2 are formed by machining.

Moreover, since the apparatus is configured to check whether the workpiece W or the fixtures 56a are shifted, or whether the predetermined machining shapes W1 and W2 are formed by machining when starting the machining of the workpiece W, when changing tools, and when completing the machining of the workpiece W, it is possible to check at any time whether the workpiece W or the fixtures 56a are shifted, or whether the predetermined machining shapes W1 and W2 are formed by machining. Therefore, problems occurring during machining can be recognized immediately.

Thus, one embodiment of the present invention has been described above. However, specific modes in which the present invention can be realized are not limited thereto.

The machine tool 50 provided with the machining state checking apparatus 1 is never limited, and any machine tool 50 can be acceptable. For example, instead of such machining center as described in the above embodiment, the machining state checking apparatus 1 of the present invention may be provided on a lathe. Additionally, the number of the arranged actual CCD camera 11 and the number of the arranged virtual CCD camera 15 are not each limited to one, and a plurality of cameras may be arranged. And the timing of checking whether the workpiece W or the fixtures 56a are shifted, or whether the predetermined machining shapes W1 and W2 are formed by machining is not limited to the timing described above.

Further, in the above embodiment, it is configured so that only an edge corresponding to the contour line of the workpiece W and fixtures 56a, workpiece W, fixtures 56a, machining shape W1 of the workpiece W, machining shapes W1 and W2 of the workpiece W, or machining shape W2 of the workpiece W is extracted from the edges in the virtual image. However, the invention is not limited thereto, and it may be configured so that all the edges of the workpiece W and fixtures 56*a*, workpiece W, fixtures 56*a*, machining shape W1 of the workpiece W, machining shapes W1 and W2 of the workpiece W, machining shape W2 of the workpiece W are extracted from the virtual image. In this case, all the edges of the workpiece W and fixtures 56*a*, workpiece W, fixtures 56*a*, machining shape W1 of the workpiece W, machining shapes W1 and W2 of the workpiece W, machining shape W2 of the workpiece W are detected also from the actual image.

Reference Signs List

1 machining state checking apparatus
  11 actual CCD camera
  12 camera parameter storage section
  13 model data storage section
  14 model data updating section
  15 virtual image generating section
  15*a* virtual CCD camera
  16 edge extracting section
  17 detection area setting section
  18 edge detecting section
  19 edge comparing section
  50 machine tool
  56 table
  56*a* fixture
  W workpiece
  W1, W2 machining shape Citation List Patent Literature Japanese Unexamined Patent Application Publication No. 2006-326740

The invention claimed is:

1. A machining state checking method for checking, in a machine tool machining a portion to be machined of a workpiece fixed by a workpiece fixture to form a predetermined machining shape on the workpiece, whether the workpiece or the workpiece fixture is shifted, or whether the predetermined machining shape is formed by machining, the machining state checking method comprising:

an actual image generating step of imaging a pre-machined workpiece, a workpiece having the predetermined machining shape formed thereon, or the workpiece fixture, which are fixed on the machine tool, by a camera from a predetermined view point, and generating actual two-dimensional image data thereof;

a virtual image generating step of generating virtual two-dimensional image data of the workpiece, workpiece fixture, or machining shape of the workpiece, based on data on a three-dimensional model of the workpiece or workpiece fixture, the virtual image generating step in which: a three-dimensional space is virtually set;

a three-dimensional model of the workpiece including the machining shape, three-dimensional model of the workpiece excluding the machining shape, three-dimensional model of the workpiece fixture, or three-dimensional model of the machining shape of the workpiece is arranged in the virtual three-dimensional space, and a simultaneously imager having the same condition as that of the camera is virtually set and arranged; and then virtual two-dimensional image data which is assumed to be obtained when the workpiece, workpiece fixture, or machining shape is imaged by a virtual imager from the same view point as that of the camera, is generated; and a comparing step of comparing the actual two-dimensional image data and virtual two-dimensional image data generated in the actual image generating step and the virtual image generating step, respectively, the comparing step of comparing the portion corresponding to the workpiece, workpiece fixture, or machining shape in the actual two-dimensional image and the virtual two-dimensional image of the workpiece, workpiece fixture, or machining shape of the workpiece, and determining whether they match each other.

2. A machining state checking apparatus for checking, in a machine tool machining a portion to be machined of a workpiece fixed by a workpiece fixture to form a predetermined machining shape on the workpiece, whether the workpiece or the workpiece fixture is shifted, or whether the predetermined machining shape is formed by machining, the machining state checking apparatus comprising:

a camera for imaging a pre-machined workpiece, workpiece having the predetermined machining shape formed thereon, or the workpiece fixture, which are fixed on the machine tool, from a predetermined view point, and generating actual two-dimensional image data thereof;

model data storage for storing data on a three-dimensional model of the workpiece or workpiece fixture;

a virtual image generator for generating virtual two-dimensional image data of the workpiece, workpiece fixture, or machining shape of the workpiece, based on the model data stored in the model data storage, the virtual image generator in which: a three-dimensional space is virtually set; a three-dimensional model of the workpiece including the machining shape, three-dimensional model of the workpiece excluding the machining shape, three-dimensional model of the workpiece fixture, or three-dimensional model of the machining shape of the workpiece is arranged in the virtual three-dimensional space, and a simultaneous imager having the same condition as that of the camera is virtually set and arranged; and then virtual two-dimensional image data which is assumed to be obtained when the workpiece, workpiece fixture, or machining shape of the workpiece is imaged by the virtual imager from the same view point as that of the camera, is generated; and a comparer for comparing the actual two-dimensional image data and virtual two-dimensional image data generated by the camera and the virtual image generator, respectively, the comparer for comparing the portion corresponding to the workpiece, workpiece fixture, or machining shape of the workpiece in the actual two-dimensional image and the virtual two-dimensional image of the workpiece, workpiece fixture, or machining shape of the workpiece, and determining whether they match each other.

3. The machining state checking apparatus according to claim 2, wherein the comparer comprises:

an edge extracting section for, based on the virtual two-dimensional image data generated by the virtual image generator, extracting an edge corresponding to at least the contour line of the workpiece, workpiece fixture, or machining shape of the workpiece from the edges in the virtual two-dimensional image;

an edge detecting section for, based on the actual two-dimensional image data generated by the camera, detecting an edge corresponding to at least the contour line of the workpiece, workpiece fixture, or machining shape of the workpiece from the actual two-dimensional image; and an edge comparing section for comparing the edge extracted by the edge extracting section and the edges detected by the edge detecting section, and determining whether they match each other.

4. The machining state checking apparatus according to claim 3, wherein the comparer includes a detection area setting section for, based on the edge extracted by the edge extracting section, setting a detection area including the extracted edge and having a given width along the extracted edge, and the edge detecting section is configured to detect an edge existing in the detection area on the actual two-dimensional image as the edge corresponding to the contour line, based on the detection area set by the detection area setting section and the actual two-dimensional image data generated by the camera.

5. The machining state checking apparatus according to claim 3, wherein the edge comparing section is configured to determine that the edge detected by the edge detecting section and the edge extracted by the edge extracting section match each other when the relationship between the sum of the length of the edge detected by the edge detecting section and the sum of the length of the edge extracted by the edge extracting section satisfies a predetermined standard.

6. The machining state checking apparatus according to claim 4, wherein the edge comparing section is configured to determine that the edge detected by the edge detecting section and the edge extracted by the edge extracting section match each other when the relationship between the sum of the length of the edge detected by the edge detecting section and the sum of the length of the edge extracted by the edge extracting section satisfies a predetermined standard.

* * * * *